United States Patent [19]

Willard

[11] 4,013,226
[45] Mar. 22, 1977

[54] VARIABLE JET NOZZLE WITH BALANCED TWO-DIMENSIONAL BLOCKER FLAP

[75] Inventor: Charles M. Willard, Creve Coeur, Mo.

[73] Assignee: The United States of America as represented by the Secretary of the Navy, Washington, D.C.

[22] Filed: Apr. 14, 1976

[21] Appl. No.: 676,952

[52] U.S. Cl. .................. 239/265.29; 239/265.37
[51] Int. Cl.² ........................................ B64C 15/06
[58] Field of Search ............... 239/265.11, 265.19, 239/265.25–265.43; 244/23 D, 110 B; 60/228, 229, 230, 263, 271

[56] References Cited
UNITED STATES PATENTS

| | | | |
|---|---|---|---|
| 2,947,499 | 8/1960 | Douglas | 239/265.29 |
| 2,974,480 | 3/1961 | Kurti | 239/265.39 |
| 3,057,150 | 10/1962 | Horgan | 239/265.29 X |
| 3,302,889 | 2/1967 | DiSabato | 239/265.29 |
| 3,354,649 | 11/1967 | Madden | 239/265.39 X |

*Primary Examiner*—Johnny D. Cherry
*Assistant Examiner*—Andres Kashnikow
*Attorney, Agent, or Firm*—Richard S. Sciascia; Don D. Doty; Harvey A. David

[57] ABSTRACT

A variable area jet nozzle construction capable of blocking flow in favor of another nozzle in a vertical or short take-off aircraft utilizes a balanced two-dimensional flap that is pivotable about rollers and movable, along curved tracks cooperable with the rollers, to assume a plurality of nozzle area varying or blocking positions under the influence of linear hydraulic actuators.

9 Claims, 4 Drawing Figures

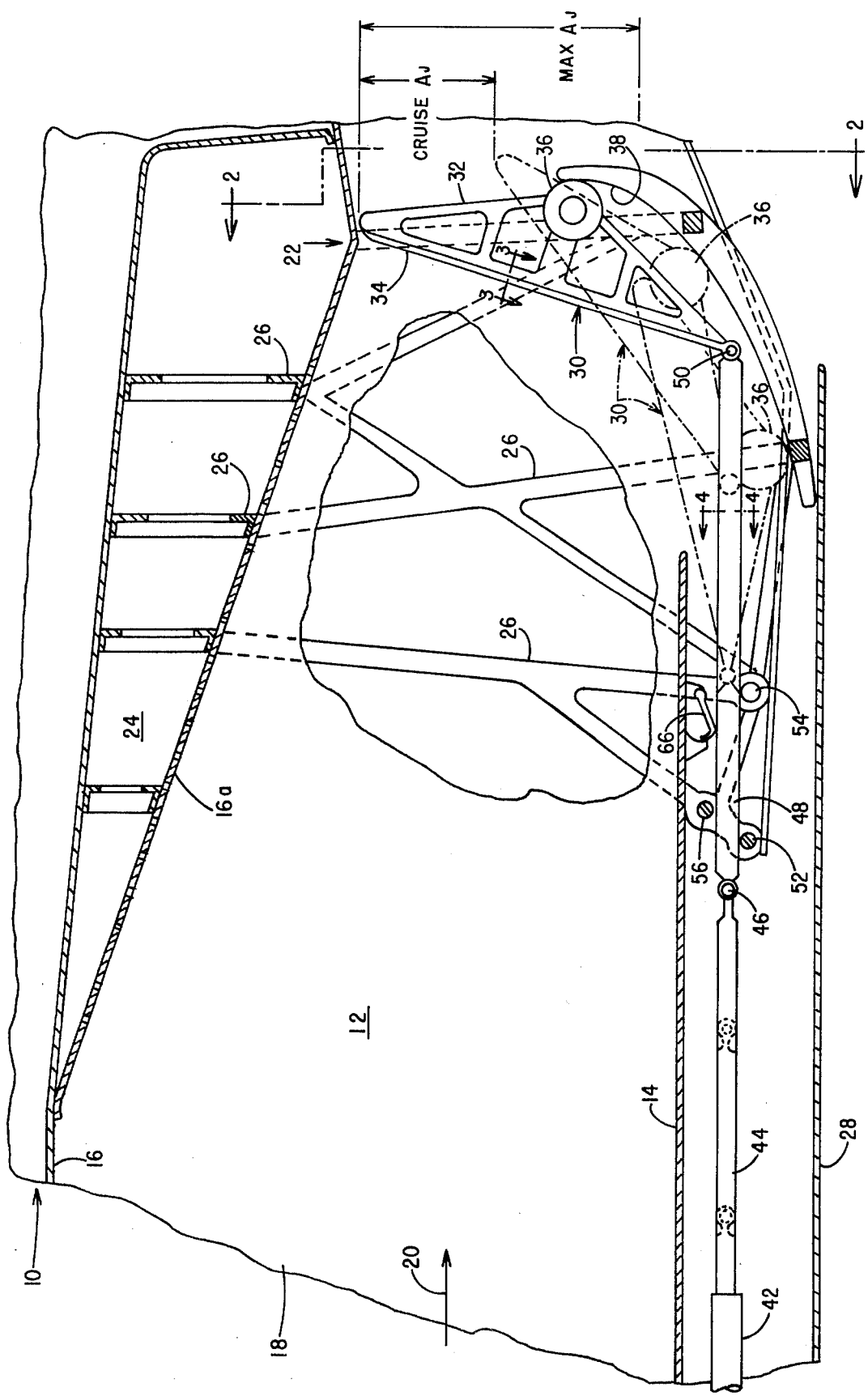

VARIABLE JET NOZZLE WITH BALANCED TWO-DIMENSIONAL BLOCKER FLAP

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to jet propelled aircraft of the vertical or short take-off and landing (V/STOL) variety, and more particularly to controllable flap constructions for partially or wholly obturating or blocking jet gas flow in a nozzle portion of the propulsion system.

In the operation of a jet powered V/STOL aircraft changes in jet thrust direction are utilized to obtain transition between hovering and forward flight modes. These changes can be obtained in several known ways including rotation of an entire engine, use of deflector flaps or steerable nozzles, and controlled blocking of alternate discharge nozzles. This invention is directed to improvements in the last mentioned approach.

The use of a blocking device to controllably vary the effective area of a jet exhaust nozzle requires that the device be capable of withstanding substantial forces without blow off and must be capable of being adjusted against exhaust gas forces by means of actuators of reasonable size, weight, and power requirements. Moreover, the blocker device and its actuators must be of suitable configuration to permit full flow area when in an opened position.

SUMMARY OF THE INVENTION

With the foregoing in mind, it is a principal object of this invention to provide a novel and improved variable jet nozzle construction incorporating a blocker-flap presenting a substantially two-dimensional, plane blocking surface.

Another object of the invention is the provision of a propulsive jet nozzle blocking apparatus comprising a substantially two-dimensional blocker-flap operable through a range of positions, between a substantially fully open position and a substantially fully closed position, for controlling the effective area open to gas flow during forward flight and for throttling the flow in favor of flow through a separate and different nozzle or passage during hovering and transitory flight.

Yet another object is to provide a jet nozzle and blocker apparatus of the foregoing character wherein actuator forces are minimized in part by providing a blocker flap which is pivotable about central rollers or wheels so as to be effectively balanced with respect to forces generated by impinging high velocity gas.

Still another object is to provide a substantially two-dimensional blocker flap apparatus wherein the flap is both tiltable and movable in translation while reactionary forces are transferred from the flap to the airframe through rollers cooperating with curved tracks fixed to the airframe.

Other objects and many of the attendant advantages will be readily appreciated as the subject invention becomes better understood by reference to the following detailed description, when considered in conjunction with the accompanying drawings.

DESCRIPTION OF THE DRAWINGS

FIG. 1 is a longitudinal sectional view of a portion of a V/STOL jet aircraft including a nozzle-blocking two-dimensional flap apparatus embodying the invention;

DESCRIPTION OF THE PREFERRED EMBODIMENT

Figure 2:
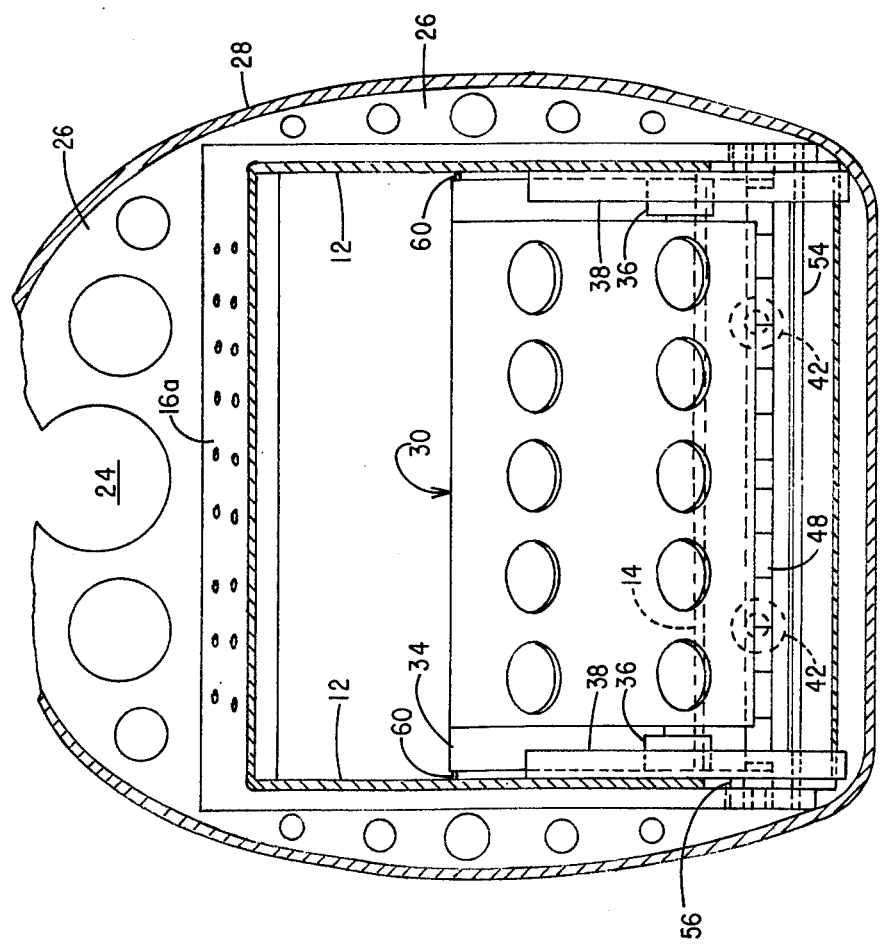
FIG. 2 is a sectional view of the aircraft taken substantially along line 2—2 of FIG. 1, but showing the flap in a different operative position.

Referring to FIGS. 1 and 2 of the drawings, there is illustrated a portion of the airframe 10 of a V/STOL jet aircraft. Airframe 10 contains duct sidewalls 12, a bottom wall 14, and an upper wall 16 defining a passage 18, which may be an afterburner duct, through which high velocity gases are caused to flow in the direction of arrow 20 when the aircraft is in flight. A perforated upper wall 16a slopes inwardly in the direction of flow 20 to define a restricted nozzle zone according to usual practice. Perforated wall 16a is backed up by a chamber 24 which is pressurized by gas pressure to reduce stress on the metal of wall 16a. The duct walls are confined within a rigid, skeletal framework including struts or formers 26 about which an outer skin 28 is provided.

In accordance with the invention, a blocker flap, generally indicated at 30, is provided that is movable between a nozzle blocking position and positions providing a range of nozzle areas suitable for differing operating condition. Flap 30 comprises a generally triangular truss-work 32 on the base of which is carried a rectangular flap plate 34, which presents a substantially plane, two-dimensional blocking surface. At opposite ends of the apex of the truss-work 32 are mounted a pair of rollers or wheels 36. Wheels 36 are in cooperating engagement with a pair of laterally spaced, curved tracks 38 that are rigidly mounted on the skeletal framework.

Mounted below bottom wall 14 are a pair of double acting hydraulic cylinder type actuators 42, each comprising a piston rod 44 adapted to exert actuating forces longitudinally of the airframe 10. The piston rods 44 of actuators 42 have their outer ends pivotally connected at 46 to one end of a horizontal sync plate 48, the other end of which is hingedly connected at 50 to the lower end of the blocker flap 30. Sync plate 48, which operates in synchronism with blocker flap 30, serves both as an actuator link and as an extension of bottom wall 14 to prevent loss of jet gases whenever the blocker flap is in any of its partially or fully blocking positions. This sync plate 48 is confined to linear movement by guiding and supporting rollers 52 and 54 on one side of the sync plate and a roller 56 on the other side thereof. Rollers 52, 54, and 56 extend parallel to one another transversely of the airframe and have their ends suitably journalled for rotation in end portions of the framework struts or formers 26.

Figure 3:
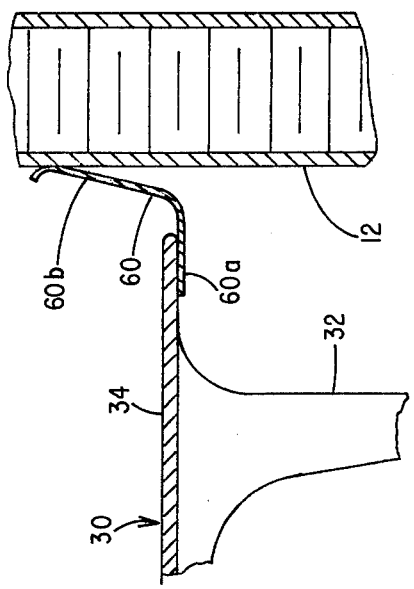
FIG. 3 is a fragmentary sectional view, on an enlarged scale, taken substantially along line 3—3 of FIG. 1 and showing flap sealing and side wall constructions.
Figure 4:
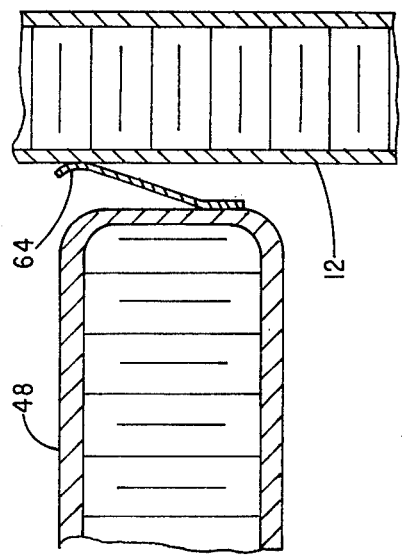
FIG. 4 is a fragmentary sectional view, on an enlarged scale, taken substantially along line 4—4 of FIG. 1 and showing sealing and structure of a sync plate portion of the apparatus.

Referring to FIG. 3, it will be noted that sealing of the flap plate 34 of blocker flap 30 relative to the side walls 12 is accomplished by means of resiliently flexible, angular, metal sealing strips 60 fixed to opposite side edges of plate 34. Each strip 60 has one leg portion 60a fixed to plate 34 and the other leg portion 60b extending forwardly against the direction of gas flow and bearing in sliding engagement with the adjacent wall 12. Increases in pressure will act to increase the sealing effect of strips 60. It may also be noted each edge of sync plate 48 is provided with a resiliently flexible metal sealing strip 64 adapted to slidingly bear against the adjacent duct wall 12, one such strip being illustrated in FIG. 4. Plate 48 is also conveniently formed of a light weight, heat resistant sandwich material.

A transverse sealing element 66 is mounted beneath lower wall 14, extending between the struts 26 in which roller 54 is journalled. Sealing element 66 cooperates with the upper surface of the sync plate 48 to prevent loss of gases between wall 14 and the sync plate.

When the blocker flap 30 is in its full-line position of FIG. 1, the nozzle zone 22 of the duct passage 18 is substantially fully obturated. In that condition the flow of gases is diverted to another, downwardly directed jet nozzle opening (not shown) for effecting vertical thrust in a manner well known to those skilled in the art to which the invention pertains. When the aircraft has attained the desired altitude for transition to forward flight, actuator 42 is operated to move piston rod 44 and sync plate 48 forwardly, that is to the left as viewed in FIG. 1, thereby drawing the blocker flap 30 out of the fully closed, full-line position. Such movement can be modulated as necessary to achieve desired conditions of thrust. For example, for maximum economy during cruising flight conditions an intermediate blocker flap position, illustrated in single dot and dash lines in FIG. 1 and full line in FIG. 2, may be desired. On the other hand, during periods of maximum thrust requirements, a maximum nozzle area (Max Aj) can be achieved by positioning the blocker flap 30 shown in double dot and dash lines in FIG. 1.

It will be noted that during movements between the Max Aj position and the fully closed position, the actuator rods 44 and the sync plate 48 move linearly, while the wheels 36 cooperate with the curved tracks 38 to produce the translation and tilting of the blocker flap 30 necessary to effect the desired throttling action as a substantially two-dimensional surface. Because the blocker flap 30 is centrally pivoted, rotational forces thereon from impinging high velocity, pressurized gases are substantially balanced on opposite sides of the pivotal axis. Moreover, the total thrust of the blocker-flap 30 is transferred to the airframe 10 through the wheels 36 and tracks 38. Accordingly, the actuators 42 need only be of minimal size and power to effect the desired movements of the blocker-flap between its various positions. The described two-dimensional flap, wheel, and track combination has the further advantage of being retracted into a smaller space alongside the duct than is possible with transversely sliding gates or clamshell flaps.

When the blocking-flap 30 is in its fully open, or retracted position, the surface of the flap-plate 34 serves as a wall portion of the duct 18 and may desirably be slightly inclined, as illustrated, so as to help define the nozzle zone 22. In its partially closed positions, the slope of the plate 34 provides a smooth, desirable profile to the nozzle zone.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A variable, jet nozzle throttling apparatus in combination with the airframe of a V/STOL jet aircraft including a duct that is defined in part by parallel first and second walls and by converging third and fourth walls to define a jet nozzle zone, said apparatus comprising:
    a blocker-flap comprising a generally triangular truss-work having a base side and an apex opposite said base side, wheel means mounted at said apex for rollingly and pivotally supporting said blocker flap, and a flap plate mounted on said base side and presenting a substantially two-dimensional blocking surface;
    curved track means, mounted on said airframe at opposite sides of said duct, for cooperation with said wheels; and
    linear actuator means, mounted on said airframe adjacent said third wall and coupled to one end of said blocker-flap, for moving said blocker-flap in translation and tilt along said track means between open positions wherein said blocking surface defines a nozzle zone wall and a closed position wherein said blocking surface obturates said duct.

2. Apparatus as defined in claim 1, and further comprising:
    a sync plate coupling said actuator means to said blocker-flap; and
    guide means, mounted on said airframe, for confining said sync plate to linear movement parallel to said third walls so as to form a variable extension thereof between said third wall and said blocker-flap.

3. Apparatus as defined in claim 2, and further comprising:
    resiliently flexible sealing means, mounted on the side edges of said flap plate and slidably engaging said first and second walls, for effecting substantially gas tight seals between said blocker-flap and said first and second walls.

4. Apparatus as defined in claim 3, and further comprising:
    resiliently flexible sealing means, mounted on the side edges of said sync plate and slidably engaging said first and second walls, for effecting substantially gas tight seals between said sync plate and said first and second walls.

5. Apparatus as defined in claim 4, and further comprising:
    a transverse sealing means, mounted on said airframe between said third wall and said sync plate, for effecting a substantially gas tight seal therebetween.

6. Apparatus as defined in claim 5, and wherein:
    said curved tracks are characterized by a decreasing radius of curvature going from a forward end portion that extends substantially parallel to said gas flow in said duct to a rearward end portion that extends substantially normal to gas flow in said duct.

7. Apparatus as defined in claim 6, and wherein:
    said linear actuator means comprises a pair of parallel, laterally spaced hydraulic cylinders.

8. Apparatus as defined in claim 7, and wherein:
said sync plate is hingedly connected to one end of said blocker-flap so as to provide a substantially gas tight articulated joint therebetween.

9. Apparatus as defined in claim 8, and wherein: said guide means comprises a plurality of spaced, parallel rollers extending transversely across said sync plate, on opposite sides thereof, and having end portions rotatably journalled in said airframe.

* * * * *